S. BURQUE.
CAR FENDER.
APPLICATION FILED JAN. 10, 1918.
1,274,508.
Patented Aug. 6, 1918.
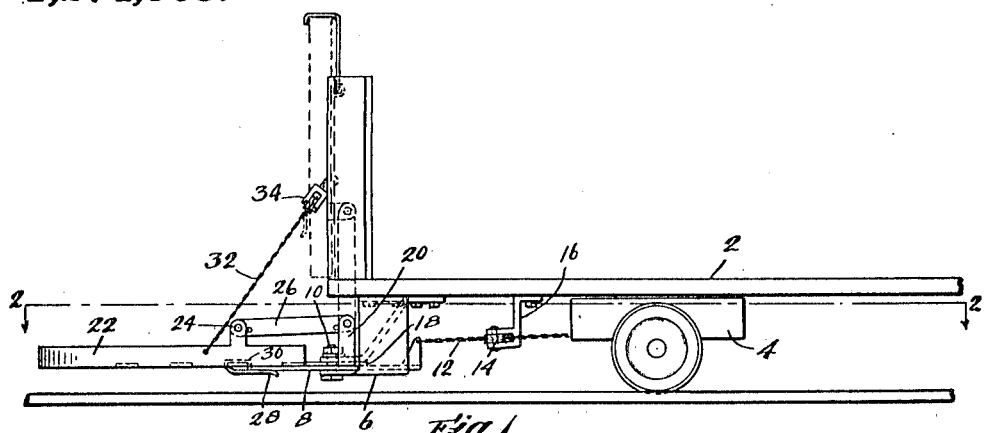
Fig. 1.
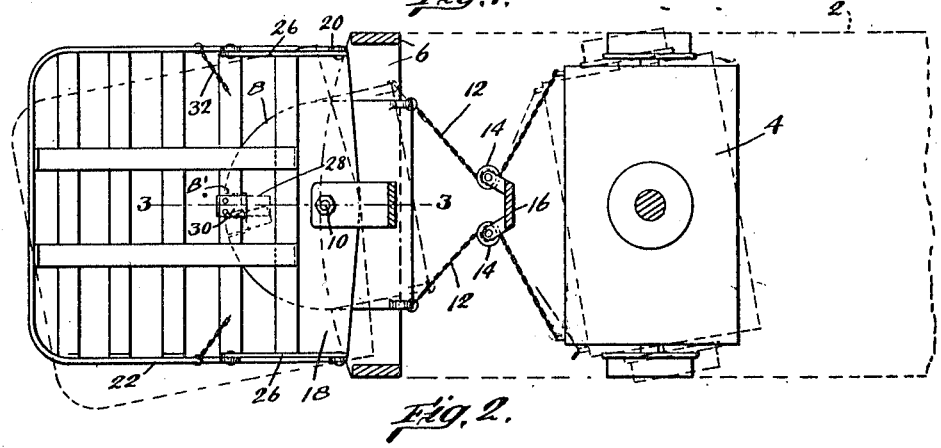
Fig. 2.
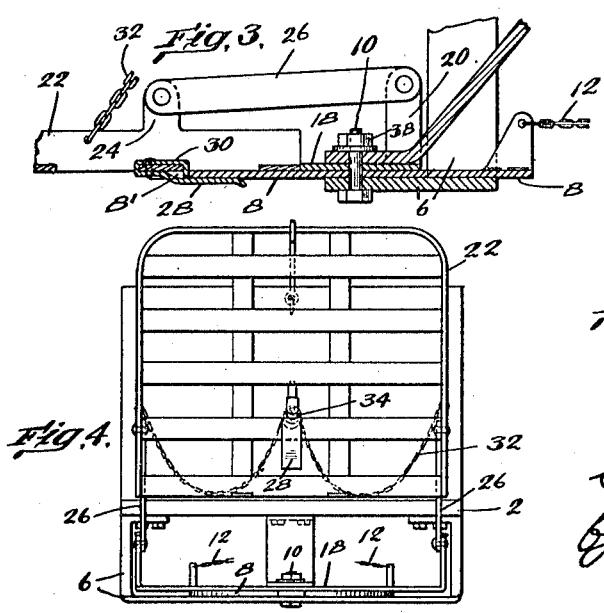
Fig. 3.
Fig. 4.
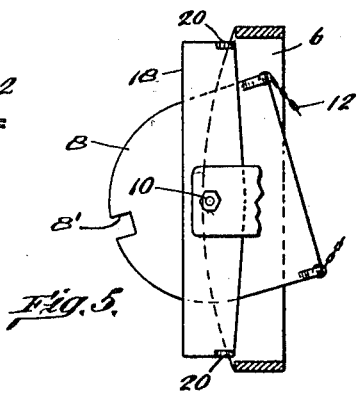
Fig. 5.
Inventor,
Sylvain Burque

UNITED STATES PATENT OFFICE.

SYLVAIN BURQUE, OF LYNN, MASSACHUSETTS.

CAR-FENDER.

1,274,508.

Specification of Letters Patent.

Patented Aug. 6, 1918.

Application filed January 10, 1918. Serial No. 211,110.

*To all whom it may concern:*

Be it known that I, SYLVAIN BURQUE, a citizen of the United States, and a resident of Lynn, county of Essex, and State of Massachusetts, have invented an Improvement in Car-Fenders, of which the following is a specification.

This invention relates to car fenders and, more particularly, to that type of fender which is pivotally mounted on the car to swing horizontally, so as to follow the rails at the curves, as well as at the straight portions, the position of the fender being controlled by the adjacent wheel truck which is pivoted to the car body.

The object of my invention is to provide an improved form of fender of this character by means of which an ordinary fixed fender may be readily converted into one of the swinging type at comparatively small expense, and with which the fender may be raised from its position of use and become automatically disconnected from the mechanism which causes it to swing when not in use.

I accomplish this object by the means shown in the accompanying drawing, in which:

Figure 1 is a side elevation of a car fender embodying my invention.

Fig. 2 is a plan view thereof.

Fig. 3 is a detail sectional view on the line 3—3 of Fig. 2.

Fig. 4 is a front view, showing the fender in raised position.

Fig. 5 is a detail plan view of a portion of the fender swinging mechanism.

In the drawing 2 indicates the bottom or floor of the car, and 4 a wheel truck which is mounted to swing relative thereto in the usual manner. A rigid support 6 is provided, which extends horizontally, crosswise of the car, and is connected to the underside of the car body by upwardly extending end portions, and a yoke 8 is pivotally mounted on the upper side of said support, a pivot bolt 10 being extended therethrough at the middle thereof. The ends of said yoke are respectively connected, by chains 12, to the corresponding ends of the wheel truck, said chains passing about idle pulleys 14, mounted on a bracket 16, secured to the underside of the car body, so that as the truck swings with relation to the car body in one direction, the yoke 8 will be swung in the same direction, as indicated by the dotted line position of Fig. 2.

A fender supporting bar 18 is pivotally mounted on the bolt 10 directly above the yoke 8, but independently thereof, said bar extending horizontally crosswise of the car body and having ears 20 at each end. A fender frame 22, of common form, is provided, said frame having upwardly extending lugs 24 at each side thereof, which are connected to the ears 20 of said bar 18 by links 26, said parts being so arranged that when the fender is in its horizontal position of use, its rear end will be supported in close proximity to the front side of the bar 18 and will overlap the front portion of the yoke 8 and rest thereon. A tongue 28 is secured on the under side of one of the fender bars and is arranged to extend beneath the front portion of the yoke 8 and bear against the under side thereof, when in position of use, and a finger 30 is also secured on the fender and arranged above said tongue in position to engage said yoke in a notch 8' formed in the front edge of the yoke 8, at the middle thereof, to form a connecting means between said yoke and the fender so that, when the yoke is swung toward either side, it will cause the fender to swing correspondingly.

A supporting chain 32 for the fender is connected to its opposite sides, and extends over a supporting pulley block 34 attached to the front of the car body. A rigid bracket 36 is connected to the underside of the car body and extends in position to receive the upper end of the pivot bolt 10, which is connected thereto by a nut 38, so that said bracket 36 acts as a support for the parts through which the bolt passes.

With the parts in the position of Figs. 1, 2, and 3 it will be apparent that swinging movement of the yoke 8, caused by the swinging of the wheel truck, as the car enters a curved portion of the track, will act through the finger 30 to cause the fender to be swung therewith. The tongue 28 acts to hold the fender against upward swinging movement on the pivots which connect the links 26 with the bar 18 independently of the yoke, and prevents one from being disconnected from the other by reason of violent up and down swinging of the end of the car.

When it is desired to swing the fender up against the dash board, out of use, it is merely necessary to lift upward on the extreme front end of the fender, so that it is first swung on the pivots connecting the ears 24 and the links 26. This movement will cause the tongue 28 to be swung from beneath the yoke 8, so that, by the time the fender has been swung to a nearly vertical position, these parts will be entirely disengaged, and the fender may be then pushed back against the front, or dash board of the car, by swinging it on the pivots which connect the link 26 with the ear 20, into the dotted line position of Fig. 1. In this position the fender is entirely disconnected from the yoke 8, which may then swing independently thereof, as indicated in Fig. 5, without moving the fender. The parts may be readily reconnected by a reverse movement thereof; that is, the disconnection of the fender from, and its reconnection to the parts which normally cause it to swing so as to follow the track, being merely incidental to the raising and lowering of the fender.

By employing the above described mechanism, fixed fenders of the ordinary horizontal type may be converted into fenders of the swinging type without serious difficulty or expense.

I claim :—

1. In combination with a car having a pivotally mounted wheel truck, a yoke pivotally mounted beneath the car body, connecting means between said truck and yoke to cause corresponding swinging movement thereof, a fender, a support therefor mounted to swing about the axis of said yoke and interlocking means between said yoke and fender to cause simultaneous swinging movement thereof.

2. In combination with a car having a yoke mounted thereon to swing about a centrally and vertically disposed pivot, a cross bar mounted to swing about the pivot of said yoke, a fender having a pivotal connection with said cross bar and said yoke arranged to be operatively engaged when the fender is in normal position and to be disengaged when the fender is swung upwardly, and means to swing said yoke about its pivot to cause corresponding swinging movement of said fender.

3. In combination with a car having a horizontally swinging actuator, a fender pivotally supported independently of said actuator to swing horizontally in unison therewith and to swing vertically independently thereof, and interlocking means between said fender and actuator arranged to be automatically engaged when the fender is swung downwardly and to be disengaged when it is swung upwardly.

4. In combination with a car a transversely disposed yoke mounted to swing horizontally about a centrally arranged axis, a similarly disposed support arranged to swing about the axis of said yoke, a fender, links connecting said support and said fender permitting upward swinging movement of the fender out of position of use, means on said fender arranged to be engaged with said yoke when said fender is swung downwardly into position of use and means for automatically swinging said yoke according to the direction of the car tracks.

5. In combination with a car a transversely disposed yoke mounted to swing horizontally about a centrally arranged axis, a similarly disposed support arranged to swing about the axis of said yoke, a fender, links connecting said support and said fender permitting upward swinging movement of the fender out of position of use, means on said fender arranged to engage said yoke when in position of use to lock the fender and yoke against independent horizontal swinging movement and to prevent upward swinging movement of the fender with relation to the yoke on its rearmost pivotal connection with said support.

In testimony whereof, I have signed my name to this specification.

SYLVAIN BURQUE.